(12) United States Patent
Thieffry et al.

(10) Patent No.: US 9,415,842 B2
(45) Date of Patent: Aug. 16, 2016

(54) FLOATING SUPPORT FOR AN OFFSHORE STRUCTURE, IN PARTICULAR SUCH AS A WIND TURBINE

(75) Inventors: Philippe Thieffry, Larmor Plage (FR); Cyrille Jacques Moiret, Lanester (FR)

(73) Assignee: DCNS, Paris (FR)

( * ) Notice: Subject to any disclaimer, the term of this patent is extended or adjusted under 35 U.S.C. 154(b) by 105 days.

(21) Appl. No.: 13/822,615

(22) PCT Filed: Jul. 13, 2012

(86) PCT No.: PCT/EP2012/063837
§ 371 (c)(1),
(2), (4) Date: Jul. 3, 2013

(87) PCT Pub. No.: WO2013/010957
PCT Pub. Date: Jan. 24, 2013

(65) Prior Publication Data
US 2013/0276691 A1 Oct. 24, 2013

(30) Foreign Application Priority Data
Jul. 15, 2011 (FR) .................................. 11 56463

(51) Int. Cl.
*B63B 35/44* (2006.01)

(52) U.S. Cl.
CPC ............. *B63B 35/44* (2013.01); *B63B 35/4406* (2013.01); *B63B 2035/446* (2013.01); *Y02E 10/727* (2013.01)

(58) Field of Classification Search
CPC .. B63B 2035/446; B63B 35/44; B63B 9/065; B63B 2021/505; B63B 35/4406
USPC .................................................. 114/264–267
See application file for complete search history.

(56) References Cited

U.S. PATENT DOCUMENTS 5,297,899 A 3/1994 Culley
7,156,586 B2 * 1/2007 Nim ........................... 405/223.1

FOREIGN PATENT DOCUMENTS

| JP | 9 111734 A | 4/1997 |
| JP | 2001-241374 A | 9/2001 |
| WO | WO 2005/099377 A2 | 10/2005 |

* cited by examiner

*Primary Examiner* — Andrew Polay
(74) *Attorney, Agent, or Firm* — Knobbe, Martens Olson & Bear, LLP

(57) ABSTRACT

This floating support (1) for an offshore structure, in particular such as a wind turbine, of the type including means in the form of a support mast (2), the upper part of which is associated with the structure and the lower part of which is associated with means in the form a float (3), is characterized in that the means in the form a float (3) comprise means in the form of a cage (9, 10, 11) for receiving buoyancy tanks (12).

8 Claims, 2 Drawing Sheets

FLOATING SUPPORT FOR AN OFFSHORE STRUCTURE, IN PARTICULAR SUCH AS A WIND TURBINE

FIELD OF THE INVENTION

The present invention relates to a floating support for an offshore structure, in particular such as a wind turbine. More particularly, the invention relates to such a floating support that includes means in the form of a support mast, the upper part of which is associated with the structure, for example such as a nacelle of the wind turbine, and the lower part of which is associated with means in the form of a float, and possibly means forming a ballast.

BACKGROUND OF THE INVENTION

A wide variety of floating supports of this type are already known in the state of the art.

As a general rule, the float-forming means are made by welding and assembling large metal tubes making it possible to obtain the desired level of buoyancy.

However, one can see that such means in the form of a float use a significant quantity of steel, are relatively difficult to handle and install, and are relatively expensive to manufacture due to the material and the manufacturing methods used.

SUMMARY OF THE INVENTION

The aim of the invention is therefore to resolve these problems.

To that end, the invention relates to a floating support for an offshore structure, in particular such as a wind turbine, of the type including means in the form of a support mast, the upper part of which is associated with the structure and the lower part of which is associated with means in the form of a float, characterized in that the means in the form of a float comprise means in the form of a cage for receiving buoyancy tanks.

According to other features of the support according to the invention, considered alone or in combination:
- the or each cage is attached to a support column of the means in the form of a float;
- several cages are attached to each support column;
- the buoyancy tanks are made from a plastic material by rotational molding;
- the means in the form of a cage means are made from wire mesh;
- the means in the form of a cage means are made by mechanical welding;
- the means in the form of a float have a generally flared shape from the lower part of the means in the form of a support mast; and
- the means in the form of a float include several support columns regularly distributed around the mast-forming means.

BRIEF DESCRIPTION OF THE DRAWINGS

The invention will be better understood using the following description, provided solely as an example and done in reference to the appended drawings, in which.

DETAILED DESCRIPTION OF THE PREFERRED EMBODIMENT

Figure 1:
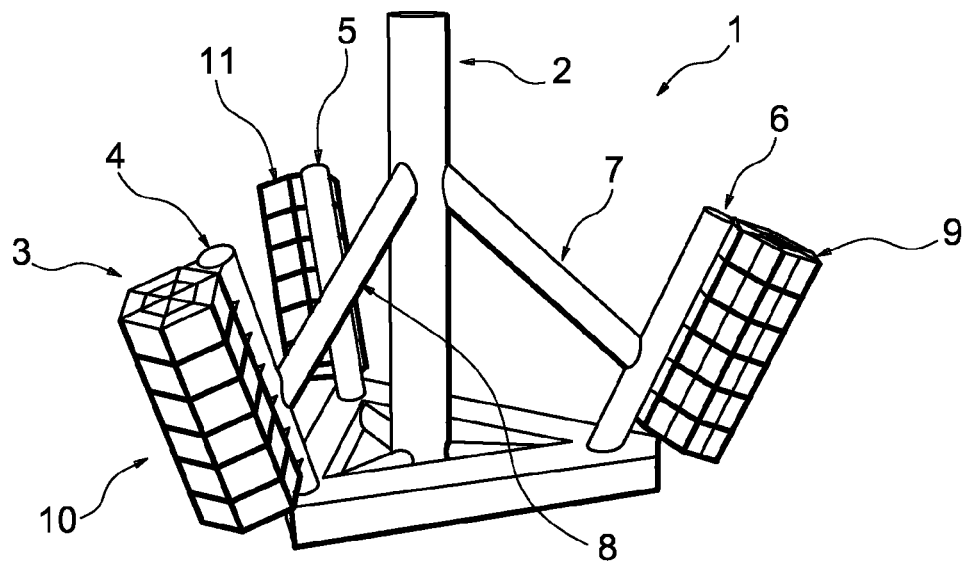
FIG. 1 shows part of a floating support according to the invention.

The figures, and in particular FIG. 1, show a floating support for an offshore structure, in particular such as a wind turbine.

The support is designated by general reference 1 in this FIG. 1 and traditionally includes means in the form of a support mast designated by general reference 2, the upper part of which is associated with the structure, for example such as the nacelle of the wind turbine, and the lower part of which is associated with means in the form of a float designated by general reference 3 in that figure.

In general, these float-forming means include a structure with a base of support columns and beams, for example made from metal and welded to each other.

Three columns are for example designated by general references 4, 5, and 6 in these figures, and are distributed around means in the form of a support mast while two beams 7 and 8, respectively, are also illustrated.

In fact and in the illustrated example, these means form a base that has a generally flared shape from the lower part of the mast-forming means and the various columns are regularly distributed around the latter so as to improve the stability of the assembly thus obtained.

According to the invention, the float-forming means also include means forming a cage for receiving buoyancy tanks, for example rotationally molded from plastic, said cage-forming means being fixed on the columns, for example.

Thus for example in FIG. 1, three cage-forming means of this type, designated by references 9, 10 and 11, are illustrated and are associated with the corresponding support columns 4, 5 and 6.

Figure 2:
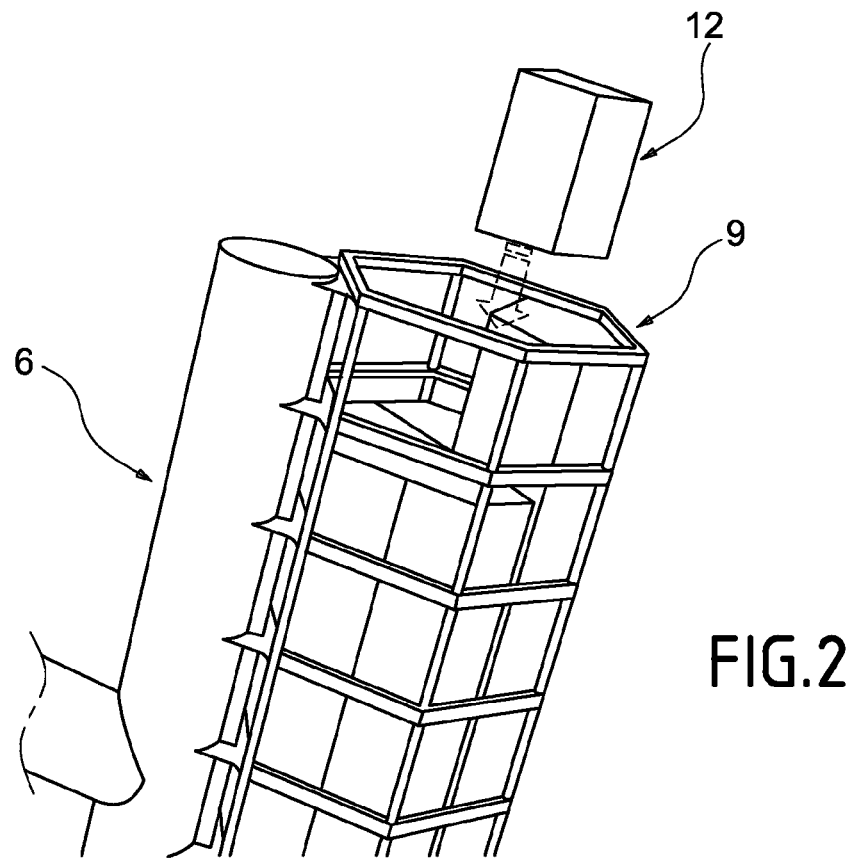
FIG. 2 shows a detailed view of the structure of means in the form of a float included in the composition of such a floating support.

FIG. 2 shows a detail of the embodiment of the cage-forming means 9 associated with the support column 6.

In fact and as illustrated, said cage-forming means assume the form of a cage made from wire mesh for example made by mechanical welding and which is suitable for receiving buoyancy tanks, for example such as the tank designated by general reference 12.

As previously indicated, these tanks may for example be made by rotational molding from plastic, and are configured so as to stack next to each other and on each other in the cage-forming means so as to fill the latter depending on the necessary buoyancy.

To that end, the cage-forming means for example have an open end allowing the passage of said tanks in those means, and that open end of said cage-forming means can then be closed by a lid making it possible to keep those various tanks in position.

One can see that these tanks must be stacked on each other so as to occupy the inner volume of that cage, and that that assembly on the one hand makes it possible to reduce the manufacturing costs of the support, and on the other hand to facilitate the handling thereof, while making it possible to adapt the buoyancy characteristics of the assembly.

In the illustrated example embodiment, the cage-forming means have a polygonal cross-section, but of course other cross-sections may also be considered and other shapes thereof may be designed so as to adapt to the shape of the columns, for example.

Figure 3:
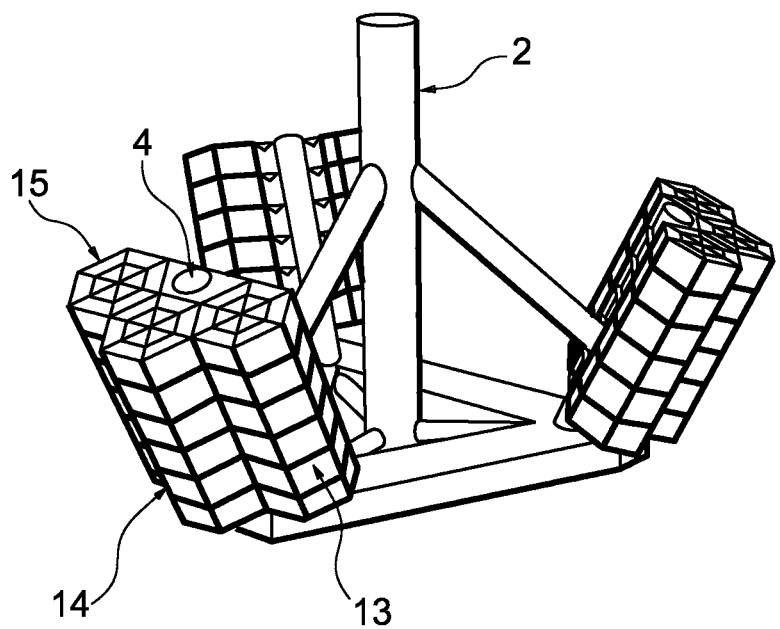
FIG. 3 shows an alternative embodiment of such a floating support.

Likewise, and as illustrated in FIG. 3, each column of the float-forming means can be associated with several cages for receiving tanks fixed on each of them.

Thus for example, FIG. 3 shows mast-forming means 2 and the column 4 around which, in that example embodiment, three cages for receiving buoyant tanks are received, those cages being designated by references 13, 14 and 15, respectively.

Still other embodiments may of course also be considered.

The invention claimed is:

1. A floating support for an offshore structure comprising: a support mast, the upper part of which is associated with said offshore structure and the lower part of which is fixed to a plurality of floats, wherein the plurality of floats comprises support columns in contact with the lower part of the support mast, regularly positioned around the support mast and inclined outwardly relative to the support mast, wherein the plurality of floats has a cone's frustum shape, which widens out from the lower part of the support mast, the cone's frustum defining a large base and a small base, the large base being closer to the offshore structure than the small base, and wherein each of the floats in the plurality of floats comprise a cage configured to receive one or more buoyancy tank(s), the cages being fixed to the support columns.

2. The floating support according to claim 1, wherein the cages are attached to each of the support columns.

3. The floating support according to claim 1, wherein the one or more buoyancy tank(s) are made from a plastic material by rotational molding.

4. The floating support according to claim 1, wherein the cages are made from wire mesh.

5. The floating support according to claim 1, wherein the cages are made by mechanical welding.

6. The floating support according to claim 1, wherein the offshore structure is a wind turbine.

7. The floating support according to claim 1, wherein each of the cages has a polygonal cross section.

8. The floating support according to claim 1, wherein the one or more buoyancy tank(s) are configured to be stacked next to each other in the cages, so as to occupy at least a part of an inner volume of the cages.

* * * * *